(12) United States Patent
Aida (10) Patent No.: US 8,651,239 B2
(45) Date of Patent: Feb. 18, 2014

(54) OIL PASSAGE STRUCTURE FOR TRANSMISSION

(75) Inventor: Kei Aida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/234,511

(22) Filed: Sep. 16, 2011

(65) Prior Publication Data

US 2012/0073905 A1    Mar. 29, 2012

(30) Foreign Application Priority Data

Sep. 28, 2010    (JP) ................................. 2010-216906

(51) Int. Cl.
*F01M 11/00*    (2006.01)
(52) U.S. Cl.
USPC ......................................... 184/6.12; 74/606 R
(58) Field of Classification Search
USPC ......................................... 184/6.12; 74/606 R
See application file for complete search history.

(56) References Cited

U.S. PATENT DOCUMENTS

| | | | | |
|---|---|---|---|---|
| 2,877,867 | A | * | 3/1959 | Cain et al. ....................... 184/1.5 |
| 3,662,858 | A | * | 5/1972 | Peterson ..................... 184/103.1 |
| 4,603,666 | A | * | 8/1986 | Martinelli ................... 123/196 S |
| 5,425,432 | A | * | 6/1995 | Hurner ....................... 184/103.2 |
| 5,568,842 | A | * | 10/1996 | Otani ........................... 184/6.22 |
| 6,021,868 | A | * | 2/2000 | Bogema ...................... 184/104.3 |
| 6,626,779 | B2 | | 9/2003 | Ohyama et al. |
| 6,863,156 | B2 | * | 3/2005 | Seemann ....................... 184/1.5 |
| 7,325,653 | B2 | * | 2/2008 | Gunderson et al. ......... 184/103.1 |
| 8,272,480 | B2 | * | 9/2012 | Jensen et al. ................. 184/6.24 |

FOREIGN PATENT DOCUMENTS

| | | |
|---|---|---|
| JP | 60-84451 | 5/1985 |
| JP | 63-178663 | 11/1988 |
| JP | 02-48662 | 4/1990 |
| JP | 2002-349667 | 5/2001 |
| JP | 2002-21991 | 1/2002 |

OTHER PUBLICATIONS

Partial English language translation of an excerpt from the Japanese Office Action mailed Apr. 9, 2013 for Japanese Application No. 2010-216906.

* cited by examiner

*Primary Examiner* — William A Rivera
*Assistant Examiner* — Michael Riegelman
(74) *Attorney, Agent, or Firm* — Smith, Gambrell & Russell, LLP.

(57) ABSTRACT

An oil passage structure for a transmission includes a transmission case having a transmission housing chamber for reserving working oil and housing a continuously variable transmission mechanism therein, and a valve housing chamber for reserving the working oil and housing a valve unit therein. Further, the valve housing chamber housing the valve unit is disposed above an oil level in the transmission housing chamber. Furthermore, the valve housing chamber and the transmission housing chamber communicate with each other through a drain port closed with a drain plug. In demounting of the valve unit, the drain plug is pulled out to open the drain port. Hereby, the working oil can be transferred from the valve housing chamber to the transmission housing chamber, and the valve unit can be demounted without draining the working oil from the transmission case.

6 Claims, 9 Drawing Sheets

OIL PASSAGE STRUCTURE FOR TRANSMISSION

CROSS-REFERENCES TO RELATED APPLICATIONS

The present application claims priority from Japanese Patent Application No. 2010-216906 filed on Sep. 28, 2010, the entire contents of which are hereby incorporated by reference.

BACKGROUND OF THE INVENTION

1. Field of the Invention

The present invention relates generally to oil passage structures for a transmission and, more particularly, to an oil passage structure for a transmission including a valve housing chamber in which oil is reserved and a valve unit is housed.

2. Description of the Related Art

An automatic transmission is provided with a plurality of clutches and brakes, which are hydraulically controlled. A continuously variable transmission, a type of automatic transmission, is further provided with a primary pulley and a secondary pulley, and the pulleys are also hydraulically controlled. The automatic transmission is provided with a valve unit having a plurality of solenoid valves in such manner as to control supplying of working oil to the aforementioned clutches, the pulleys, etc. (Refer to, for example, Japanese Unexamined Patent Application Publication Nos. 60-84451 and 2002-21991). In addition, as described in Japanese Unexamined Patent Application Publication No. 2002-21991, the valve unit is immersed in working oil within a transmission case in many instances. By immersing the valve unit in working oil, air entrapment in a hydraulic circuit can be prevented, and each individual solenoid coil of the solenoid valves can be further cooled with working oil.

Since the valve unit is immersed in working oil, it is required to drain the working oil from the transmission case when the valve unit is demounted from the transmission case upon or during maintenance work and the like on a vehicle. In addition, in a case where the working oil is drained from the transmission case, it is further required to refill the transmission case with new working oil after the valve unit is remounted in the transmission case. Thus, drainage and refilling of working oil accompanying demounting and re-mounting of the valve unit has become a factor for increasing in man-hours and cost for maintenance work.

SUMMARY OF THE INVENTION

Accordingly, it is an object of the present invention to provide an oil passage structure for a transmission so as to permit a valve unit to be demounted from a transmission case without draining oil therefrom.

An oil passage structure for a transmission according to an aspect of the present invention includes: a transmission housing chamber that is formed in a transmission case so as to reserve oil and house a transmission mechanism therein; a valve housing chamber that is formed in the transmission case and disposed above an oil level in the transmission housing chamber so as to reserve oil and house the valve unit therein; a drain port that is formed so as to communicate with the valve housing chamber and the transmission housing chamber; and a drain plug that is detachably disposed in the drain port. Upon draining oil from the valve housing chamber, oil is guided from the valve housing chamber to the transmission housing chamber after the drain plug is pulled out of the drain port, and drained oil is reserved in the transmission case.

The oil passage structure for the transmission preferably includes an oil pump that supplies oil from the transmission housing chamber to the valve housing chamber.

The oil passage structure for the transmission preferably has a first end of the drain plug that projects from an outer surface of the transmission case.

The oil passage structure for the transmission preferably includes a drain passage formed in the drain plug having a first port and a second port, the first port being open to the valve housing chamber, the second port being open to the transmission housing chamber. Excessive oil in the valve housing chamber is guided to the transmission housing chamber by way of the drain passage such that oil in the valve housing chamber is maintained at a constant level.

The oil passage structure for the transmission preferably includes as the drain plug a fastening bolt for securing the valve unit.

According to the present invention, the valve housing chamber is disposed above the oil level in the transmission housing chamber, and the valve housing chamber and the transmission chamber communicate with each other through the drain port, whereby oil can be transferred from the valve housing chamber to the transmission housing chamber by opening the drain port. As a result, there is no need to drain oil from the transmission case when the valve unit is demounted from the valve housing chamber, and, as a consequence, man-hours and cost for maintenance work on a vehicle can be reduced.

DESCRIPTION OF THE PREFERRED EMBODIMENTS

Figure 1:
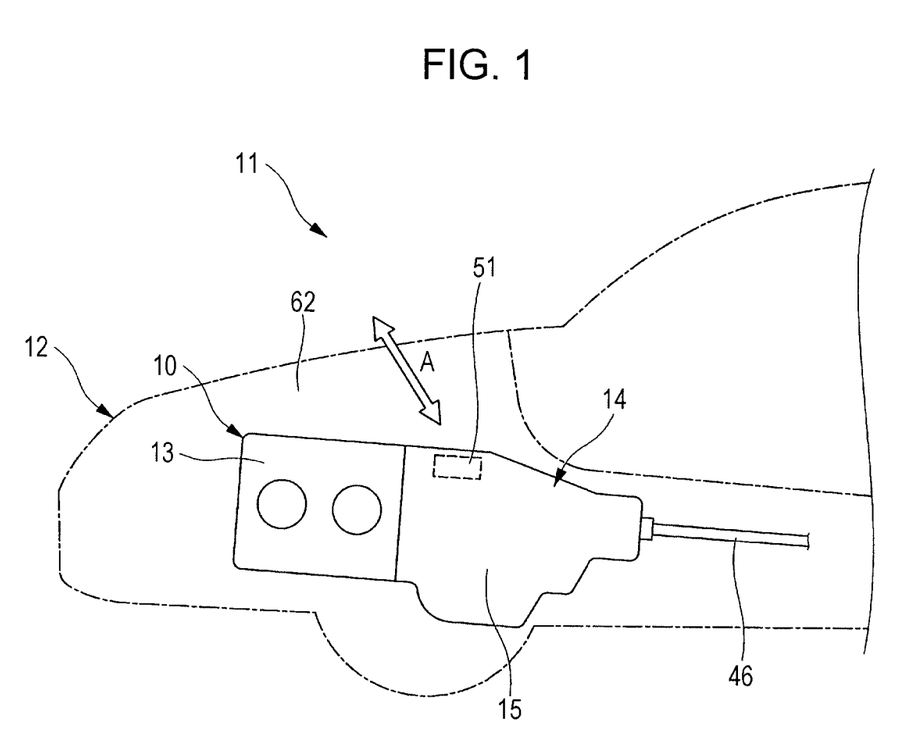
FIG. 1 is a schematic view illustrating a vehicle provided with a power unit.
Figure 2:
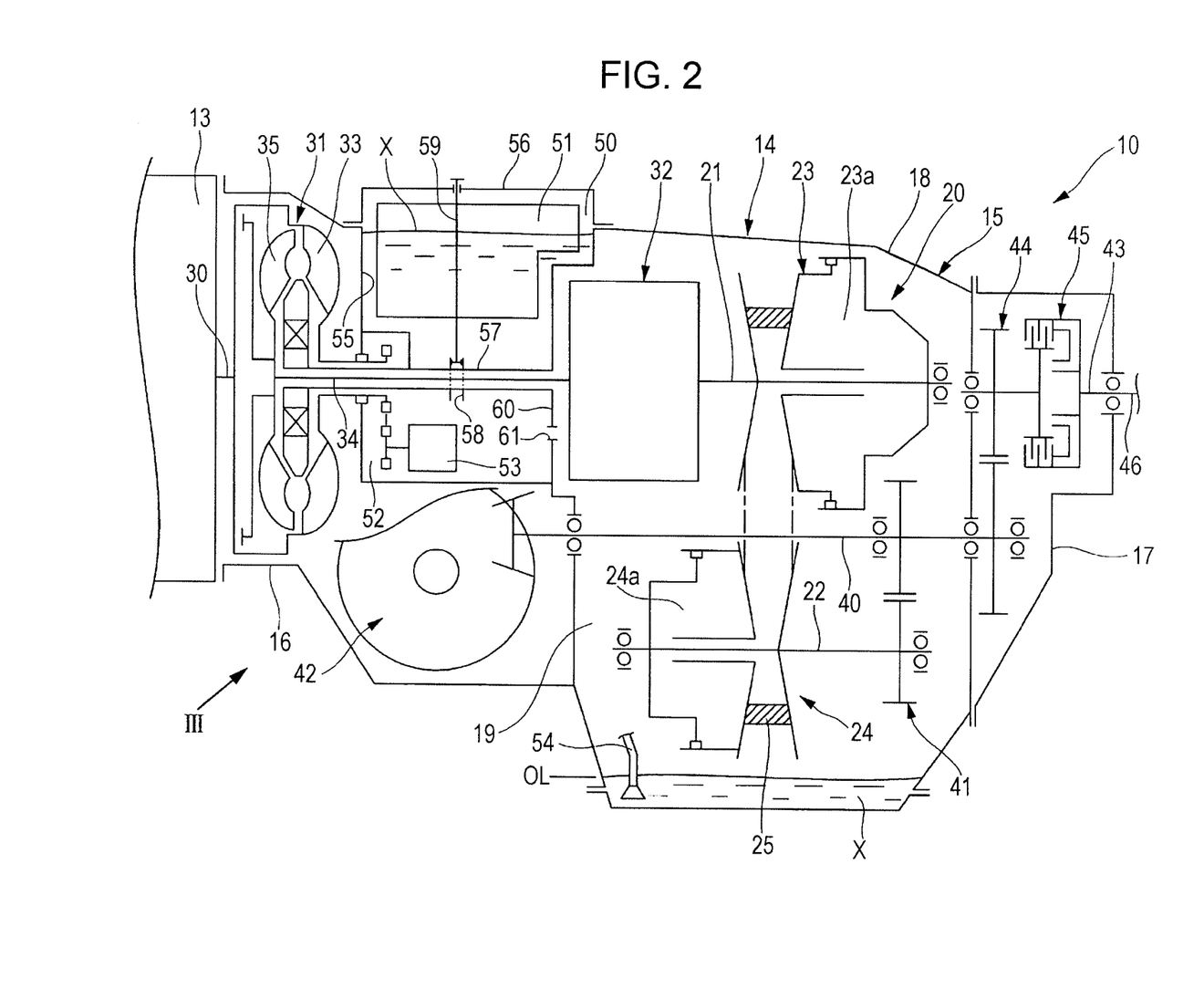
FIG. 2 is a schematic diagram illustrating an internal structure of the power unit.

The embodiments of the present invention will be described in detail below based on the accompanying drawings. FIG. 1 is a schematic view illustrating a vehicle 11 provided with a power unit 10, and FIG. 2 is a schematic diagram illustrating an internal structure of the power unit 10. As illustrated in FIG. 1, the power unit 10 is disposed in a vehicle body 12 in the longitudinal direction, and the power unit 10 includes an engine 13 and a continuously variable transmission 14. As illustrated in FIG. 2, the continuously variable transmission 14 has a transmission case 15. The transmission case 15 includes a torque converter case 16 disposed on one side of the engine 13, a transfer case 17 disposed at the posterior end of the power unit 10, and a main case 18 disposed between the abovementioned cases 16 and 17. The transmission case 15 described above is provided with a transmission housing chamber 19 that reserves working oil X and houses a continuously variable transmission mechanism 20 as a transmission mechanism therein.

The continuously variable transmission mechanism 20 has a primary shaft 21 driven by the engine 13 and a secondary shaft 22 extending parallel to the primary shaft 21. The primary shaft 21 is provided with a primary pulley 23, and the secondary shaft 22 is provided with a secondary pulley 24. The primary pulley 23 is partitioned to form an oil chamber 23a, and therefore a groove width of the primary pulley 23 can be varied by adjusting the oil pressure in the oil chamber 23a. Likewise, the secondary pulley 24 is partitioned to form an oil chamber 24a, and therefore a groove width of the secondary pulley 24 can be varied by adjusting the oil pressure in the oil chamber 24a. Accordingly, the rotation of the primary shaft 21 can be transmitted to the secondary shaft 22 in a continuously variable manner by adjusting the widths of the grooves on both of the pulleys and varying the winding diameters of a drive chain 25 for the pulleys.

In addition to the above, a torque converter 31 and a forward and reverse changeover mechanism 32 are disposed between a crank shaft 30 and the primary shaft 21 so as to transmit engine power to the continuously variable transmission mechanism 20. The torque converter 31 includes: a pump impeller 33 connected to the crank shaft 30; and a turbine runner 35 disposed opposite the pump impeller 33 and connected to a turbine shaft 34. The forward and reverse changeover mechanism 32 includes a planetary gear train (not illustrated), a clutch mechanism (not illustrated) and the like such that the rotational direction of the primary shaft 21 can be switched.

The transmission case 15 houses an output shaft 40 for front wheels extending parallel to the secondary shaft 22. The output shaft 40 for the front wheels is coupled to the secondary shaft 22 through a gear train 41, and coupled to the front wheels through a front differential mechanism 42. The transmission case 15 further houses an output shaft 43 for rear wheels extending parallel to the output shaft 40 for the front wheels. The and the output shaft 43 for the rear wheels is coupled to the output shaft 40 for the front wheels through a gear train 44 and a transfer clutch 45, and coupled to the rear wheels through a propeller shaft 46 and a rear differential mechanism (not illustrated).

A valve unit 51 is housed in a valve housing chamber 50 formed in the upper portion of the transmission case 15 in order to supply the working oil X to the aforementioned devices, such as the primary pulley 23, the secondary pulley 24, the torque converter 31, the forward and reverse changeover mechanism 32 and the transfer clutch 45. The valve unit 51 is provided with a plurality of solenoid valves, which are controlled by a control unit (not illustrated). The transmission case 15 includes a pump chamber 52 provided with an oil pump 53 so as to supply the working oil X in the transmission housing chamber 19 to the valve unit 51. Upon starting of the oil pump 53 driven by the engine 13, the working oil X in the transmission housing chamber 19 is sucked up through an oil strainer 54, and the sucked working oil X is supplied to the valve unit 51 through the oil pump 53. The working oil X supplied from the oil pump 53 to the valve unit 51 is subsequently supplied to each individual actuating portion and lubricating portion through a hydraulic circuit in the valve unit 51.

A part of the discharged working oil X is supplied to the valve housing chamber 50, and the working oil X is reserved to a predetermined oil level in the valve housing chamber 50. The valve housing chamber 50 is further provided with a drain port (not illustrated) and, hereby, the level of the working oil X therein is maintained at the predetermined level. Reserving the working oil X in the valve housing chamber 50 in this manner allows the valve unit 51 to be immersed in the working oil X. Hereby, air entrapment in the hydraulic circuit of the valve unit 51 can be prevented, and each individual solenoid coil of the solenoid valves can be cooled with the working oil X. In the case where such a structure thus immersing the valve unit 51 in the working oil X is applied to a vehicle, typically the working oil X is drained from the transmission case 15 when the valve unit 51 is demounted from the transmission case 15 upon or during maintenance work and the like on the vehicle. However, the drainage of the working oil X from the transmission case 15 becomes a factor for increasing man-hours and cost for maintenance work. On the other hand, as regards the continuously variable transmission 14 illustrated in the accompanying drawings, the valve unit 51 can be demounted without draining the working oil X from the transmission case 15 by the application of the oil passage structure for the transmission in accordance with a first embodiment of the present invention.

Figure 3:
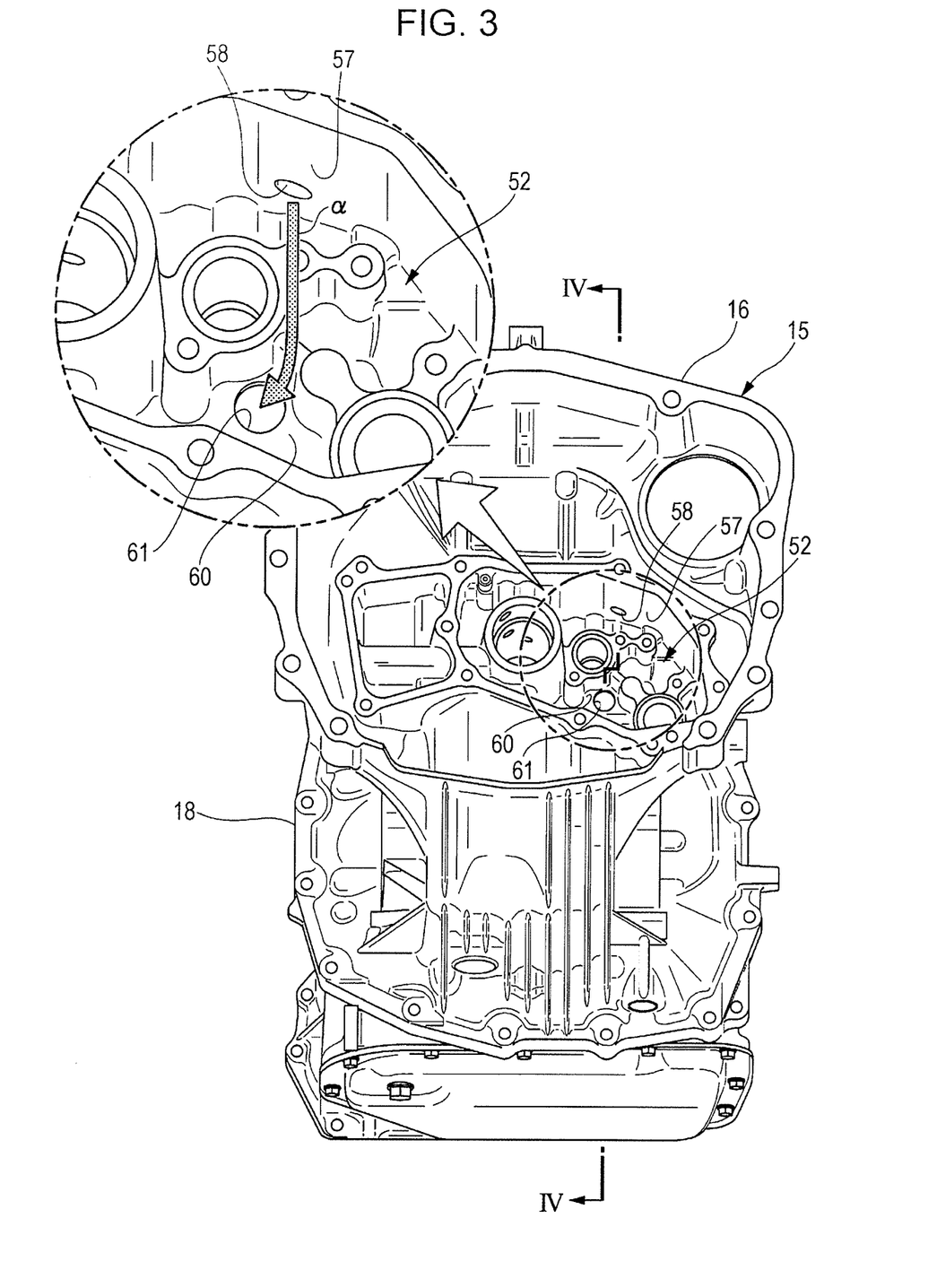
FIG. 3 is a perspective view illustrating a transmission case viewed from an arrow III of FIG. 2.
Figure 4:
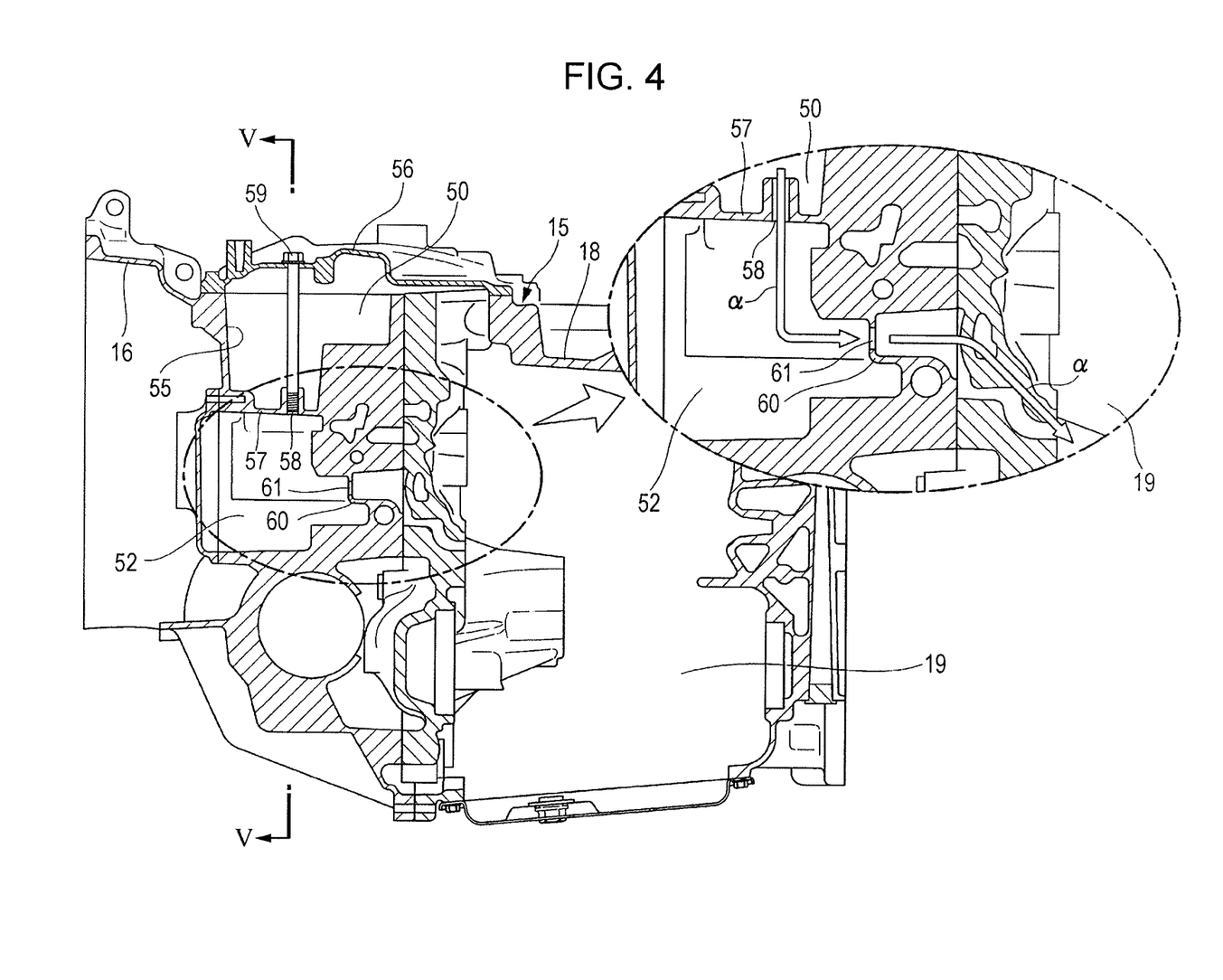
FIG. 4 is a sectional view illustrating the transmission case taken along the line IV-IV of FIG. 3.
Figure 5A:
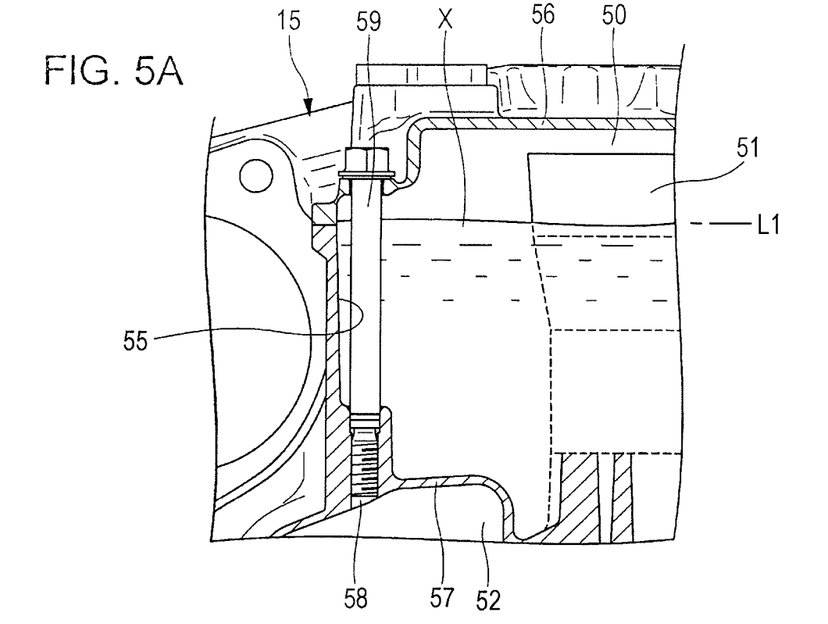
FIGS. 5A and 5B are enlarged partial sectional views illustrating a part of a valve housing chamber taken along the line V-V of FIG. 4.
Figure 5B:
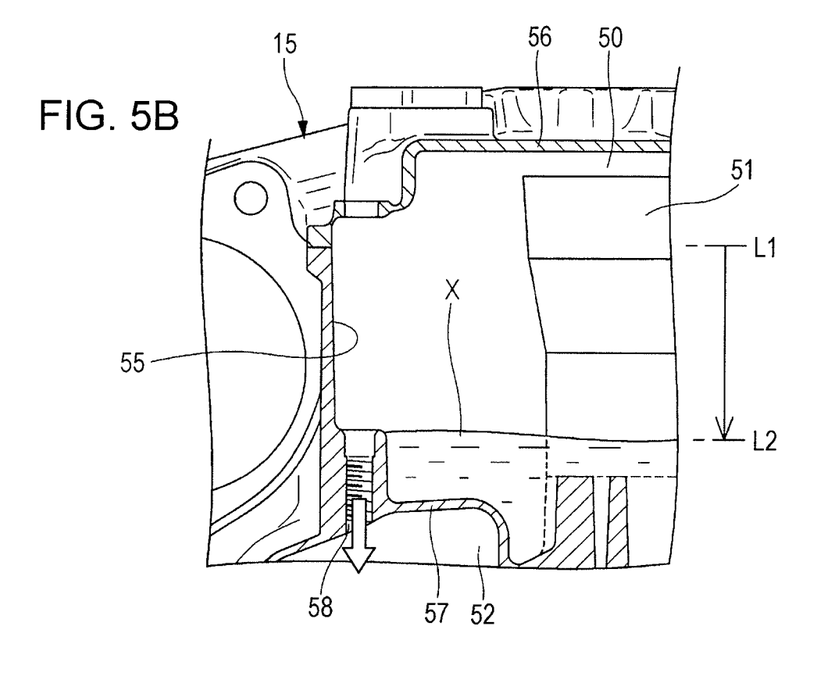
Figure 6:
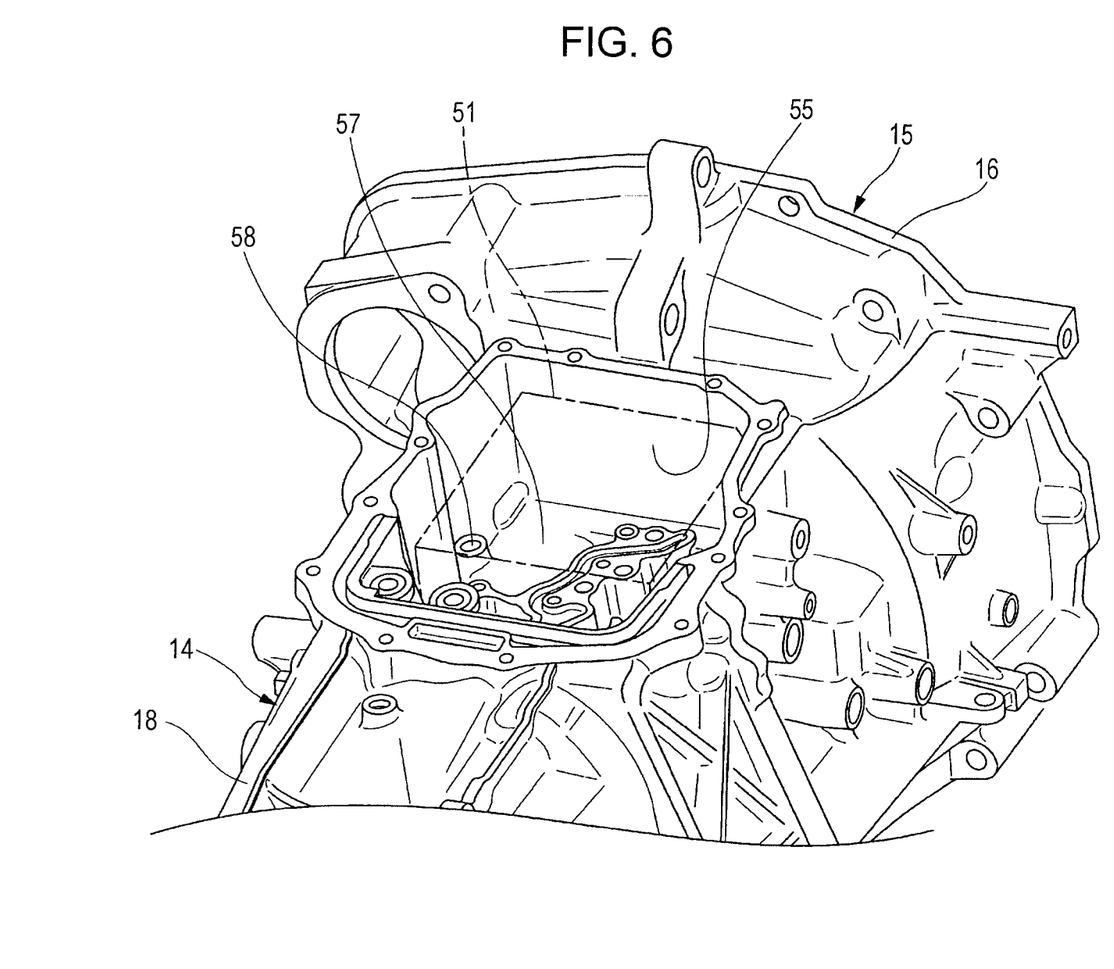
FIG. 6 is a perspective view illustrating the transmission case viewed from above.

An oil passage structure for a transmission in accordance with the first embodiment of the present invention will be described in detail below. FIG. 3 is a perspective view illustrating the transmission case 15 viewed from an arrow III of FIG. 2. FIG. 4 is a sectional view illustrating the transmission case 15 taken along the line IV-IV of FIG. 3. FIGS. 5A and 5B are enlarged partial sectional views illustrating a part of the valve housing chamber 50 taken along the line V-V of FIG. 4. FIG. 6 is a perspective view illustrating the transmission case 15 with a cover member 56 (to be hereinafter described) demounted therefrom viewed from above.

As illustrated in FIGS. 2 and 4, the valve housing chamber 50 housing the valve unit 51 includes a housing recess 55 formed in the upper portion of the transmission case 15 and the cover member 56 covering the housing recess 55. The valve housing chamber 50 is formed relative to the transmission case 15 in such manner as to be disposed above an oil level OL in the transmission housing chamber 19. As illustrated in FIGS. 2 to 4, a drain port 58 communicating with the valve housing chamber 50 and the pump chamber 52 is formed in a partition 57 partitioning the valve housing chamber 50 and the pump chamber 52 from each other. A second end of a drain plug 59 is disposed in the drain port 58 with the result that the drain port 58 is closed by the drain plug 59. A through hole 61 communicating with the pump chamber 52 and the transmission housing chamber 19 is formed in a partition 60 partitioning the pump chamber 52 and the transmission housing chamber 19 from each other. Thus, the valve housing chamber 50 and the transmission housing chamber 19 communicate with each other through the drain port 58 and the through hole 61, and the drain port 58 is closed by the drain plug 59.

In demounting the valve unit 51 from the transmission case 15, the drain plug 59 is pulled out of engagement with the drain port 58. As illustrated in FIGS. 2 and 4, a first end of the drain plug 59 projects from the outer surface of the cover member 56, and therefore the drain plug 59 can be pulled out of the drain port 58 with the cover member 56 still secured to the transmission case 15. Upon pulling the drain plug 59 out of the drain port 58, as illustrated by an arrow α of FIGS. 3 and 4, the working oil X is guided from the drain port 58 to the pump chamber 52 first, and subsequently from the through hole 61 to the transmission housing chamber 19. More specifically, while the oil level in the valve housing chamber 50 remains at the level of L1 until the drain plug 59 is pulled out of the drain port 58 as illustrated in FIG. 5A, the oil level in the valve housing chamber 50 decreases to the level of L2 after the drain plug 59 is pulled out thereof as illustrated in FIG. 5B. After the oil level in the valve housing chamber 50 decreases to the level of L2, the cover member 56 is demounted from the transmission case 15, and subsequently the valve unit 51 is demounted therefrom as illustrated in FIG. 6.

Thus, when the valve unit 51 is demounted from the transmission case 15, the working oil X in the valve housing chamber 50 can be transferred to the transmission housing chamber 19, thereby negating the need to drain the working oil X from the transmission case 15, and consequently the valve unit 51 can be quite easily demounted from the transmission case 15. Further, the working oil X in the valve housing chamber 50 is reserved in the transmission case 15, thereby further negating the need to refill the valve unit 51 with the working oil X after the valve unit 51 is re-mounted in the transmission case 15: owing to the above, man-hours and cost for maintenance work can be reduced. The working oil X, which is transferred from the valve housing chamber 50 to the transmission housing chamber 19, is supplied again to the valve housing chamber 50 by starting the oil pump 53.

Further, since the first end of the drain plug 59 is configured so as to project from the cover member 56, the drain plug 59 can be pulled out of the drain port 58 with the cover member 56 still secured to the transmission case 15. Hereby, even if the oil level L1 in the valve housing chamber 50 exceeds the abutment surfaces of the housing recess 55 and the cover member 56, the working oil X can be drained from the valve housing chamber 50 prior to the demounting of the cover member 56 from the transmission case 15. Further, the working oil X can be prevented from spilling in demounting of the cover member 56.

Furthermore, since the valve housing chamber 50 is formed relative to the transmission case 15 so as to be disposed in the upper portion of the transmission case 15 and immediately behind the torque converter 31, the valve unit 51 can be demounted from and re-mounted in an engine compartment 62 as illustrated by an arrow A of FIG. 1, even if the power unit 10 is mounted in the longitudinal direction. Accordingly, the valve unit 51 can be quite easily demounted from the engine compartment 62 and re-mounted therein. In addition, since the valve housing chamber 50 is formed above the front differential mechanism 42, space in the transmission case 15 can be efficiently utilized and an increase in size of the continuously variable transmission 14 can be further avoided.

Figure 7:
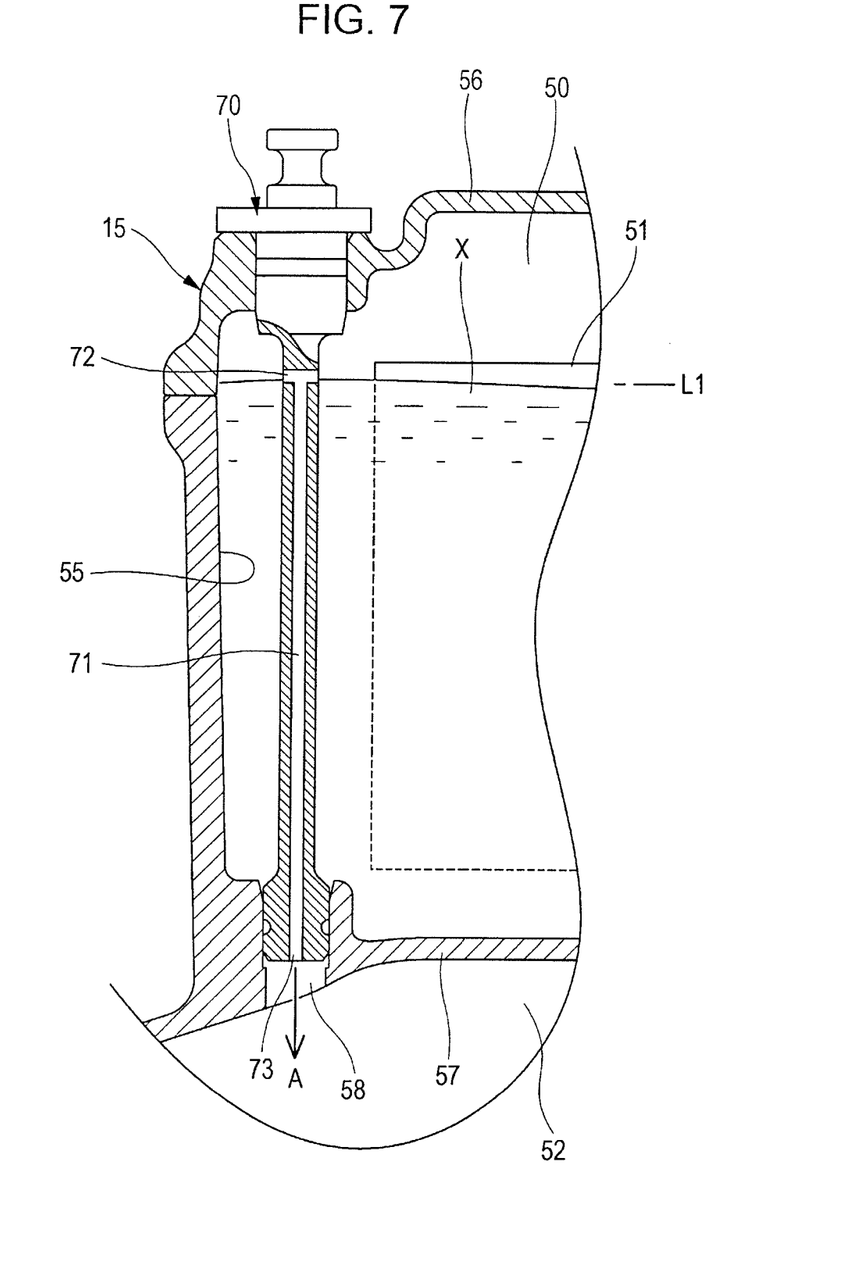
FIG. 7 is an enlarged partial sectional view illustrating a part of an oil passage structure for a transmission according to a second embodiment of the present invention.

FIG. 7 is an enlarged partial sectional view illustrating a part of an oil passage structure for a transmission in accordance with a second embodiment of the present invention. For reference sake, the same structural parts in FIG. 7 as those in FIG. 5 will be indicated by the same reference numerals and detailed description thereof will be omitted. As illustrated in FIG. 7, a drain passage 71 is formed in a drain plug 70 closing the drain port 58. A first end of the drain passage 71 is provided with a lead-in port 72 that is open to an outer side of the drain plug 70, and a second end of the drain passage 71 is provided with a drain port 73 that is open to a second end face of the drain plug 70. More specifically, while the first end of the drain passage 71 is configured so as to be open to the valve housing chamber 50, the second end of the drain passage 71 is configured so as to be open to the transmission housing chamber 19 through the pump chamber 52 and the through hole 61. Hereby, the working oil X in the valve housing chamber 50 flows through the drain passage 71 upon reaching the lead-in port 72, as illustrated by an arrow A of FIG. 7, and the working oil X is guided from the pump chamber 52 to the transmission housing chamber 19: therefore, the oil level in the valve housing chamber 50 can be constantly maintained at the level L1. In this manner, as described above, by forming the drain passage 71 in the drain plug 70, the oil level in the valve housing chamber 50 can be varied and the valve housing chamber 50 in the transmission case 15 is further applicable to various oil levels in the valve unit 51 by means of replacement of the drain plug 70 with another one. In other words, general versatility of the transmission case 15 can be enhanced.

Figure 8A:
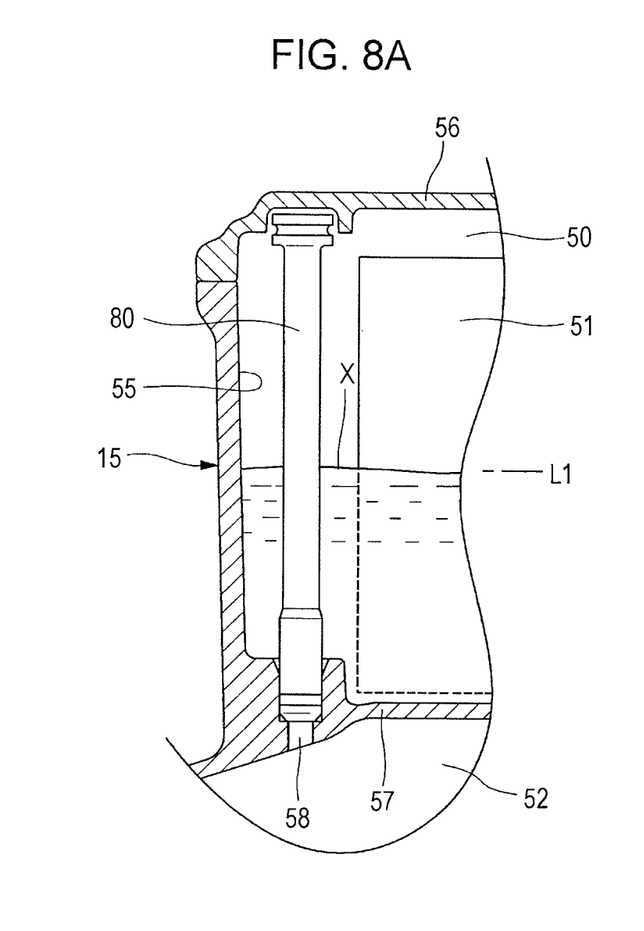
FIGS. 8A and 8B are enlarged partial sectional views illustrating a part of an oil passage structure for a transmission according to a third embodiment of the present invention.
Figure 8B:
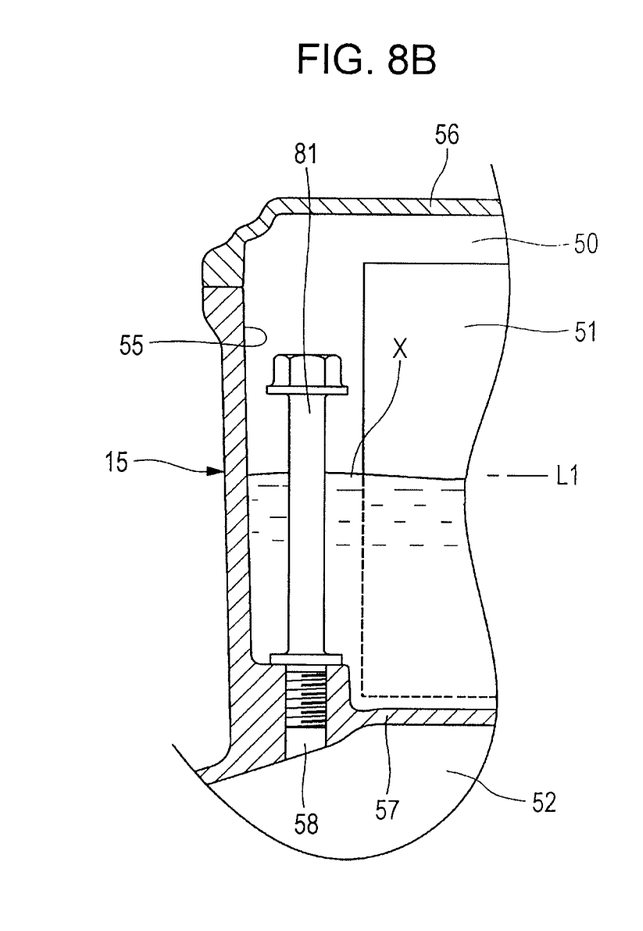

Furthermore, while the first ends of the drain plugs 59 and 70 project from the cover member 56 in the above description, the drain plugs 59 and 70 may be encased in the valve housing chamber 50 depending on the oil level L1 in the valve housing chamber 50 without being limited to the aforementioned embodiments of the present invention. FIGS. 8A and 8B are enlarged partial sectional views illustrating a part of an oil passage structure for a transmission according to a third embodiment of the present invention. For reference sake, the same structural parts in FIGS. 8A and 8B as those in FIG. 5 will be indicated by the same reference numerals and detailed description thereof will be omitted.

As illustrated in FIGS. 8A and 8B, in the case where the oil level L1 in the valve housing chamber 50 falls below the abutment surfaces of the housing recess 55 and the cover member 56, the working oil X will not overflow from the valve housing chamber 50 even if the cover member 56 is demounted from the transmission case 15 prior to drainage of the working oil X from the valve housing chamber 50: as a consequence of the above, the drain plugs 80 and 81 are encased within the valve housing chamber 50. It is to be understood that the first ends of the drain plugs 80 and 81 may project from the cover member 56 even if the oil level L1 remains low. Further, as regards a method of disposing the drain plugs 80 and 81 in the drain port 58, a second end of the drain plug 80 may be disposed in the drain port 58 as illustrated in FIG. 8A, and a second end of the drain plug 81 may be engaged with the threads of the drain port 58 as illustrated in FIG. 8B.

Figure 9A:
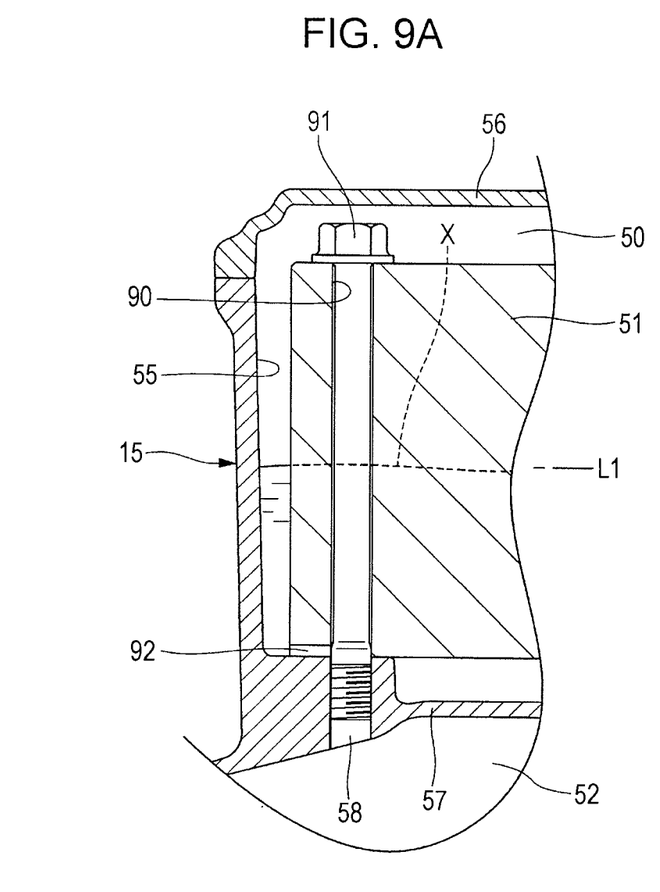
FIGS. 9A and 9B are enlarged partial sectional views illustrating a part of an oil passage structure for a transmission according to a fourth embodiment of the present invention.
Figure 9B:
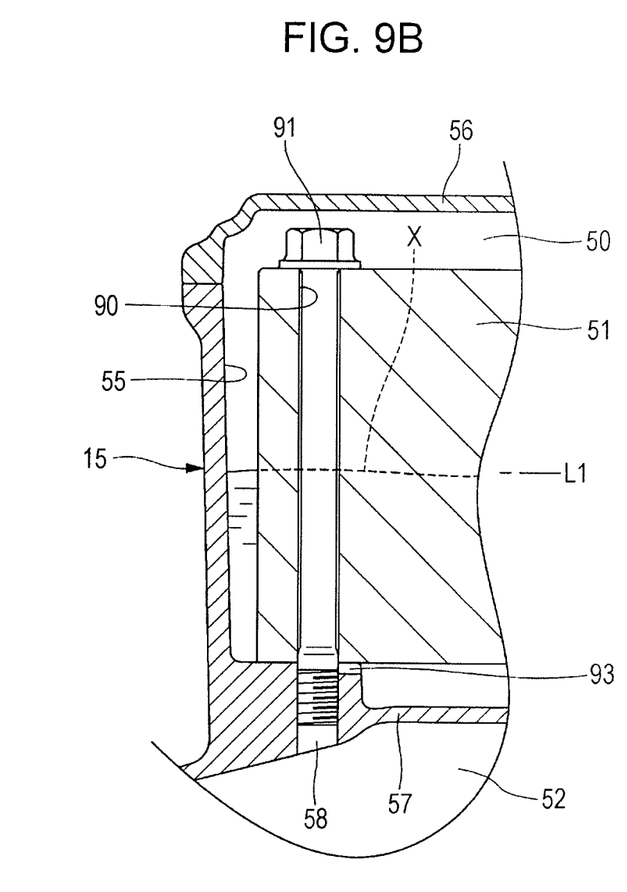

Furthermore, while the valve housing chamber 50 is provided with the drain plugs 59, 70, 80, and 81 only for the sake of opening and closing the drain port 58 in the aforementioned embodiments of the present invention, the drain plugs 59, 70, 80, and 81 may have an another function without being limited to the aforementioned embodiments. FIGS. 9A and 9B are enlarged partial sectional views illustrating a part of an oil passage structure for a transmission according to a fourth embodiment of the present invention. For reference sake, the same structural parts in FIGS. 9A and 9B as those in FIG. 5 will be indicated by the same reference numerals and detailed description thereof will be omitted.

As illustrated in FIGS. 9A and 9B, the valve unit 51 is provided with a through hole 90, and a drain plug 91 is disposed in the through hole 90. A second end of the drain plug 91 is formed with external threads, and the drain port 58 is formed with internal threads corresponding to the external threads of the drain plug 91. More specifically, the drain plug 91 has the function of not only opening and closing the drain port 58 but also securing the valve unit 51 to the valve housing chamber 50. By utilizing the drain plug 91 as a fastening bolt for securing the valve unit 51 to the valve housing chamber 50, the component parts can be shared and cost reduction of the oil passage structure for the transmission can be consequently achieved.

In addition to the above, as illustrated in FIG. 9A, a bottom end surface of the valve unit 51 is provided with a notch 92 functioning as a flow passage for the working oil X. Hereby, the working oil X can be guided from the notch 92 to the drain port 58 after the drain plug 91 is pulled out of engagement with the drain port 58. Furthermore, while the valve unit 51 is provided with the notch 92 in FIG. 9A, the housing recess 55 in the transmission case 15 may be provided with a notch 93, as illustrated in FIG. 9B, without being limiting to the aforementioned embodiment. In this case, since the notch 93 functions as the flow passage for the working oil X, the working oil X can be guided from the notch 93 to the drain port 58 after the drain plug 91 is pulled out of engagement with the drain port 58. Considering that the valve unit 51 is secured by a plurality of fastening bolts (not illustrated), it is preferable that the drain plug 91 be formed longer than the other fastening bolts in order to avoid misplacement of a bolt for the drain plug 91.

It will be apparent to one skilled in the art that the present invention is not limited to the foregoing embodiments but that various changes and modifications may be made thereto without departing from the scope of the present invention as set forth in the appended claims. For instance, while the valve housing chamber 50 and the transmission housing chamber 19 communicate with each other through the pump chamber 52 in the above description, the valve housing chamber 50 and the transmission housing chamber 19 may directly communicate with each other without being limited to the embodiments described above. In this case, the drain port 58 is formed in a partition wall partitioning the valve housing chamber 50 and the transmission housing chamber 19 from each other.

Further, while the continuously variable transmission 20 including a pair of pulleys is applied to the transmission mechanism in the above explanatory description, other embodiments of the present invention such as a troidal type continuously variable transmission mechanism, a planetary gear type automatic transmission mechanism, and a parallel shaft type automatic transmission mechanism may be selectively applied to the transmission mechanism without being limited to the aforementioned embodiments. Furthermore, while the present invention is applied to the power unit 10 mounted in the vehicle body 12 in the longitudinal direction in the aforementioned embodiments illustrated in the accompanying drawings, the present invention may be applied to a power unit mounted in the vehicle body 12 in the lateral direction without being limited to the aforementioned embodiments. In addition to the above, while the present invention is applied to the power unit 10 including only the engine 13 as a power source in the aforementioned embodiments illustrated in the accompanying drawings, the present invention may be applied to a hybrid type power unit including the engine 13 and an electrical motor as the power sources without being limited to the aforementioned embodiments.

What is claimed is:

1. An oil passage structure for a transmission comprising:
a transmission case;
a transmission housing chamber formed in the transmission case, the transmission housing chamber reserving oil and housing a transmission mechanism therein;
a valve housing chamber formed in the transmission case so as to be disposed above an oil level in the transmission housing chamber, the valve housing chamber reserving oil and housing a valve unit therein;
a drain port formed so as to communicate with the valve housing chamber and the transmission housing chamber; and
a drain plug detachably disposed in the drain port,
wherein oil reserved in the valve housing chamber is drained therefrom by pulling the drain plug out of the drain port, guiding oil from the valve housing chamber to the transmission housing chamber, and reserving oil in the transmission case,
wherein the drain plug includes an oil drain passage having a first port and a second port, the first port being open to the valve housing chamber, the second port being open to the transmission housing chamber, and
wherein excessive amount of oil in the valve housing chamber is guided to the transmission housing chamber through the oil drain passage such that an oil level in the valve housing chamber is maintained at a constant level.

2. The oil passage structure for the transmission according to claim 1, further comprising:
an oil pump that supplies oil from the transmission housing chamber to the valve housing chamber.

3. The oil passage structure for the transmission according to claim 2, wherein the drain plug has a first end that projects from an outer surface of the transmission case.

4. The oil passage structure for the transmission according to claim 2, wherein the drain plug is a fastening bolt for securing the valve unit.

5. The oil passage structure for the transmission according to claim 1, wherein the drain plug has a first end that projects from an outer surface of the transmission case.

6. The oil passage structure for the transmission according to claim 1, wherein the drain plug is a fastening bolt for securing the valve unit.

* * * * *